US009071755B2

(12) United States Patent
Tsui et al.

(10) Patent No.: US 9,071,755 B2
(45) Date of Patent: Jun. 30, 2015

(54) SPORTS CAMERA

(71) Applicant: SKY LIGHT ELECTRONIC (SHEN ZHEN) LIMITED CORPORATION, Shenzhen, Guangdong (CN)

(72) Inventors: Chiu Tsui, HongKong (HK); Xinjie Mo, Guangdong (CN); Shuai Chen, Guangdong (CN); Simon Shen, Guangdong (CN)

(73) Assignee: SKY LIGHT ELECTRONIC (SHEN ZHEN) LIMITED CORPORATION, Shenzhen (CN)

( * ) Notice: Subject to any disclaimer, the term of this patent is extended or adjusted under 35 U.S.C. 154(b) by 19 days.

(21) Appl. No.: 14/073,894

(22) Filed: Nov. 7, 2013

(65) Prior Publication Data
US 2015/0062359 A1    Mar. 5, 2015

(30) Foreign Application Priority Data

Aug. 30, 2013    (CN) ...................... 2013 2 0539472 U

(51) Int. Cl.
*H04N 5/232*    (2006.01)
(52) U.S. Cl.
CPC ....... *H04N 5/23258* (2013.01); *H04N 5/23293* (2013.01)

(58) Field of Classification Search
CPC ........ H04N 5/222; H04N 5/225; H04N 5/232
See application file for complete search history.

(56) References Cited

U.S. PATENT DOCUMENTS

| 8,934,045 B2* | 1/2015 | Karn et al. ............... 348/333.13 |
| 2010/0060747 A1* | 3/2010 | Woodman .................. 348/222.1 |
| 2012/0249797 A1* | 10/2012 | Haddick et al. ............... 348/158 |
| 2012/0303476 A1* | 11/2012 | Krzyzanowski et al. .... 705/26.5 |
| 2013/0077932 A1* | 3/2013 | Cornell et al. ................ 386/227 |
| 2013/0235222 A1* | 9/2013 | Karn et al. ................. 348/211.2 |

* cited by examiner

*Primary Examiner* — James Hannett

(57) ABSTRACT

Disclosed is a sports camera, which comprises a main control unit, an image processing module, a motion parameter detection display module, a power supply module and a memory. The power supply module is connected with the main control unit and the image processing module. The image processing module comprises a digital signal processor and an image sensor, and the motion parameter detection display module comprises a GPS module and an acceleration sensor. The main control unit is connected with the digital signal processor, the memory, the GPS module and the acceleration sensor, and said digital signal processor is connected with the memory and the image sensor. The sports camera of the present invention can make sure that the image is normal and vertical when playing back the photo or video taken by the camera, thereby improving the image effect and increasing the ease of use of the sports camera.

20 Claims, 1 Drawing Sheet

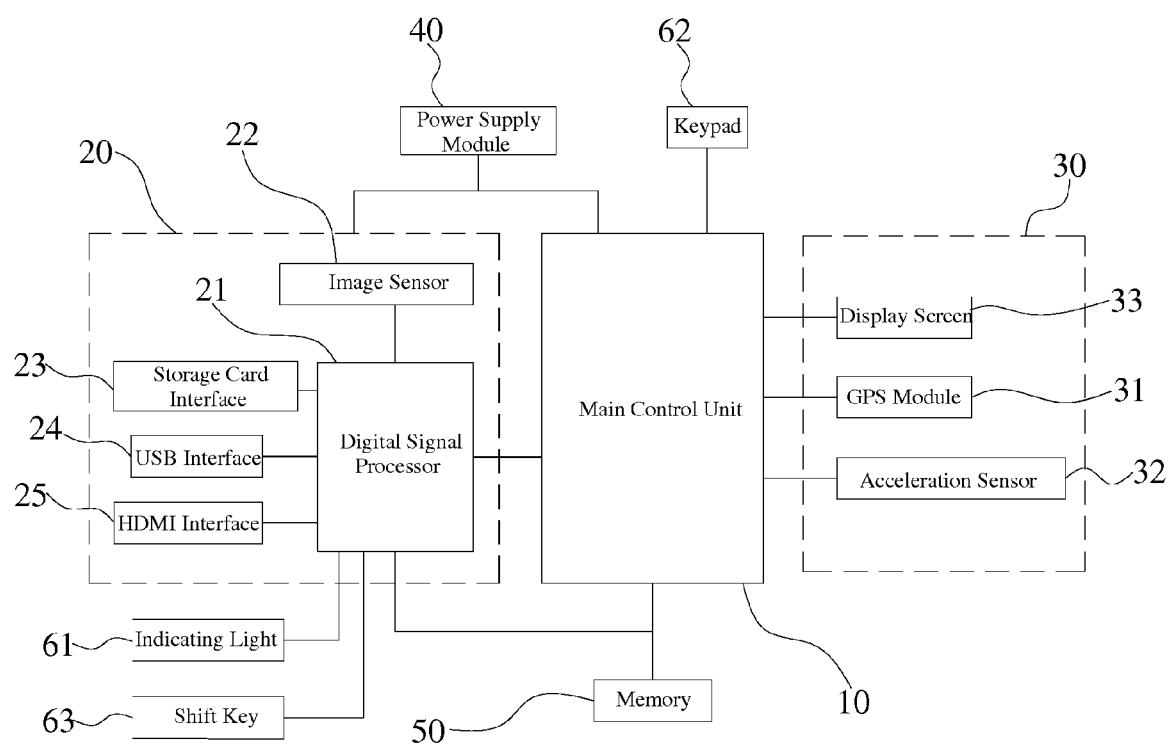

SPORTS CAMERA

CROSS-REFERENCE TO RELATED APPLICATIONS

This present application claims the benefit of Chinese patent application No. 201320539472.5 filed on Aug. 30, 2013; the contents of which are hereby incorporated by reference.

FIELD OF THE INVENTION

The present invention relates to cameras, and more particularly relates to a sports camera.

BACKGROUND OF THE INVENTION

At present, most of cameras or sports cameras on the market are provided without a GPS module, thus the photos and videos taken by such a camera cannot record some information, such as movement, time, speed and so on, in real time. Thus cannot calculate calorie consumption based on the traveling data.

Traditional cameras or sports cameras have to keep a vertical posture for shooting when using, otherwise, the photos and videos taken by these cameras will be not vertical when playing back the image file. Thus, the image played back from the camera will be a rotated image with slanting angle the same as the camera, thereby bringing inconvenience of watching and influencing the ease of use of the sports camera.

SUMMARY OF THE INVENTION

An object of the present invention is to provide a sports camera, which can carry out a deflection processing for the images taken by the camera based on the posture of the camera, thereby ensuring that the images are normal and vertical when playing back the photos and videos, additionally, it is capable of recording GPS information in real time when shooting or videotaping.

To achieve the above-mentioned object, the present invention adopts the following technical solution: there is provided a sports camera including a main control unit, an image processing module, a motion parameter detection display module, a power supply module and a memory. The power supply module is connected with the main control unit and the image processing module. The image processing module includes a digital signal processor and an image sensor and the motion parameter detection display module includes a GPS module and an acceleration sensor. The main control unit is connected with the digital signal processor, the memory, the GPS module and the acceleration sensor, and the digital signal processor is connected with the memory and the image sensor.

Furthermore, the motion parameter detection display module further includes a display screen, the display screen being connected with the main control unit.

Furthermore, the display screen is LCD screen.

Furthermore, the display screen is TFT screen.

Furthermore, the digital signal processor is provided with a storage card interface, a USB interface and a HDMI interface.

Furthermore, the chip type of the main control unit is STM32F051C8 or STM32F100C8.

Furthermore, the sports camera further includes a keypad, the main control unit being connected with the keypad.

Furthermore, the sports camera further includes an indicating light and a shift key, the digital signal processor being connected with the indicating light and the shift key.

Furthermore, the power supply module is rechargeable battery.

Compared with the prior art, the beneficial technical effects of the present invention will be described as follows:

(1) An acceleration sensor being included in the sports camera of the present invention, when starting the camera, the main control unit will transmit the information detected by the acceleration sensor to the digital signal processor, and then according to the information detected by the acceleration sensor, the digital signal processor will determine whether there is a need to carry out a deflection processing for the images taken by the camera. If the acceleration sensor detected that the camera is in deflecting posture, the digital signal processor will carry out corresponding angular deflection processing for the image and then save it, thereby ensuring that the image is normal and vertical when playing back the photo or video, improving the image effect and increasing the ease of use of the sports camera.

(2) A GPS module is included in the sports camera of the present invention, so as to obtain GPS information and record it to the image file, and then by means of analysis of the main control unit, there can obtain some data information such as movement, time, peed, calory and so on, thereby increasing the use function of the sports camera and improving the ease of use of the sports camera.

(3) In the sports camera of the present invention, the main control unit can control the image processing module and the GPS module to work independently of each other, thereby achieving a function that the GPS module can be switched on to record some data such as movement, time, speed and calory consumption when the camera is not in photography state or video state. Thus, during the use of the camera, there may shut up the image processing module and only switch on the GPS module to record the movement, time, speed, calory consumption and so on, thereby saving the energy consumption produced by the digital signal processor and prolonging the using time of the whole machine.

BRIEF DESCRIPTION OF THE DRAWINGS

FIG. 1 is a system diagram of a sports camera according to an embodiment of the present invention.

DETAILED DESCRIPTION OF ILLUSTRATED EMBODIMENTS

For understanding the technical content of the present invention more sufficiently, a technical solution of the present invention will now be further introduced and described as follows, by way of example only, with reference to a special embodiment.

FIG. 1 shows a system diagram of the present invention according to an embodiment. The sports camera of this embodiment includes a main control unit 10, an image processing module 20, a motion parameter detection display module 30, a power supply module 40 and a memory 50. In this embodiment, the chip type of the main control unit 10 is STM32F051C8, and in other embodiments, can choose a chip of STM32F100C8 type as the main control unit 10. The power supply module 40 is connected with the main control unit 10 and image processing module 20. The image processing module 20 includes a digital signal processor 21 and an image sensor 22. The motion parameter detection display module 30 includes a GPS module 31 and an acceleration sensor 32. The main control unit 10 is connected with the digital signal processor 21, the memory 50, the GPS module 31 and the acceleration sensor 32. The digital signal processor 21 is connected with the memory 50 and the image sensor 22. The digital signal processor 21 communicates with the main control unit 10 via simulate SPI for data transmission. The main control unit 10 reads the data of the acceleration sensor 32 via I2C interface. The image sensor 22 is used for collecting image information.

As show in FIG. 1, the motion parameter detection display module 30 further includes a display screen 33. The display screen 33 is connected with the main control unit 10. In this embodiment, the display screen 33 is liquid crystal display (LCD), and in other embodiment, the screen 33 also can be thin film transistor (TFT) screen. The display screen 33 is connected with the main control unit 10 via IO interface simulate SPI, and it is used for displaying some contents such as operating state of the device, menu, power, GPS path information, GPS signal strength and so on.

As shown in FIG. 1, the digital signal processor 21 is provided with a storage card interface 23, a USB interface 24 and a HDMI interface 25. The memory car interface 23 is used for inserting a storage card, such as TF card, SD card and so on. The USB interface 24 can be connected with a computer via USB line and it is used for transmitting the files stored in the storage card or used for battery charging. The HDMI interface 25 is used for outputting video signal to the display device.

As shown in FIG. 1, the sports camera further includes a keypad 62, which is connected with the main control unit 10. The keypad 62 is used for sending control instruction to the camera, so as to carry out the functions of turn left, turn right, exit and enter.

As shown in FIG. 1, the sports camera further includes an indicating light 61 and a shift key 63. The digital signal processor 21 is connected with the indicating light 61 and the shift key 63. The indicating light 61 is used for indicating photography state or video state of the camera. The shift key 63 is used for switching the functions of photography and video.

The power supply module 40 is rechargeable battery, such as lithium ion battery, nickel-metal hydride battery (NI-MH battery), lithium polymer battery, and so on, and it is used for supplying power to the whole sports camera system. By means of ADC collection of the battery power, the battery power can be displayed on the display screen 33.

The sports camera of this embodiment can regulate the deflection of shooting angle as follows:

(1) The default state (0 degree) of the sports camera is horizontal shooting. When switch on the camera, the acceleration sensor 32 will detect the deflecting angle of the camera and then send the detected information to the main control unit 10, the main control unit 10 will send the deflecting angle information to the digital signal processor 21, and then the digital signal processor 21 will make a comparison between the obtained deflecting angle information and the default value (0 degree).

(2) When the acceleration sensor 32 detected that the deflecting angle is within 0-45 degree or 315-360 degree (including the end values), the main control unit 10 will send the received information from the acceleration sensor 32 to the digital signal processor 21 and then the digital signal processor 21 will directly store the image taken by the camera without making any regulation of revolving the image.

(3) When the acceleration sensor 32 detected that the deflecting angle is within 45-135 degree (not including the end values), the main control unit 10 will send the received information from the acceleration sensor 32 to the digital signal processor 21 and then the digital signal processor 21 will make the image do a 90 degree rotation and then save it, so as to make sure that the image is still horizontal when playing back.

(4) When the acceleration sensor 32 detected that the deflecting angle is within 135-225 degree (including the end values), the main control unit 10 will send the received information from the acceleration sensor 32 to the digital signal processor 21 and then the digital signal processor 21 will make the image do a 180 degree rotation and then save it, so as to make sure that the image is still horizontal when playing back.

(5) When the acceleration sensor 32 detected that the deflecting angle is within 225-315 degree (not including the end values), the main control unit 10 will send the received information from the acceleration sensor 32 to the digital signal processor 21 and then the digital signal processor 21 will make the image do a 270 degree rotation and then save it, so as to make sure that the image is still horizontal when playing back.

When not shooting, the sports camera of this embodiment can record the movement information as follows:

(1) The main control unit 10 can work together with the image processing module 20 or work together with the GPS module 31 but the image processing module 20 is switched off. When the digital processing module 21 and the main control unit 10 being switched on simultaneously, the information collected by the GPS module 31 will be transmitted in real time to the image file taken by the camera, thereby obtaining some data such as movement, time, speed, calory consumption and so on, by decoding the GPS information.

(2) When the digital signal processor 21 being switched off, the GPS information obtained by GPS module 31 is stored in the memory 50 temporarily, and when the memory 50 is full with information, the main control unit 10 will send an instruction to start the image processing module 20, so as to transfer the GPS information from the memory 50 to the storage card of the image processing module 20 in time and after finishing the transfer, the main control unit 10 will send an instruction to shut up the image processing module 20 in real time. When the amount of information stored in the memory 50 reaches a preset value again, the main control unit 10 will send an instruction to start the image processing module 20 again, so as to transfer the GPS information from the memory 50 to the storage card of the image processing module 20 and after finishing the transfer, the main control unit 10 will send an instruction again to shut up the image processing module 20 in real time, and that cycle repeats. The GPS information stored in the storage card can be decoded to obtain some data such as movement, time, speed, and calory consumption and so on, which will be displayed on the display screen 33 or other display device.

The problem of great power consumption can be solved by the following implementation: in the existing technology, the image processing module 20 is switched on with the GPS module simultaneously. Due to the great power consumption of the image processing module 20, the time of power supply of the battery usually is too short, and generally the available time may be about 2 hours. In this embodiment, the GPS module 31 can obtain and store GPS information separately without starting the image processing module 20, thereby saving the power consumption produced by the long term of starting the image processing module 20. The technical solution of the present invention can generally support the GPS information storage for 8 hours, thereby solving the problem of high power consumption of the camera.

Above descriptions of embodiments are provided for further illustrating the technical content of the present invention, so as to facilitate understanding and it is to be understood that the invention is not to be limited to the disclosed embodiments. Any technique extension and recreation according to the present invention should be included within the scope of protection of the invention.

What is claimed is:

1. A sports camera, comprising a main control unit, an image processing module, a motion parameter detection display module, a power supply module and a memory, said power supply module being connected with the main control unit and the image processing module, wherein said image processing module comprises a digital signal processor and an image sensor, said motion parameter detection display module comprises a GPS module and an acceleration sensor, said main control unit is connected with the digital signal processor, the memory, the GPS module and the acceleration sensor, and said digital signal processor is connected with the memory and the image sensor; wherein
when the digital signal processor and the main control unit being switched on simultaneously, GPS information collected by the GPS module is transmitted in real time to an image file taken by the camera;
when the digital signal processor being switched off, the GPS information collected by the GPS module is stored in the memory temporarily, and when the memory is full or the amount of information stored in the memory reaches a preset value, the main control unit sends an instruction to start the image processing module to transfer the GPS information from the memory to a storage card in time and after finishing the transfer, the main control unit sends an instruction to shut up the image processing module in real time.

2. The sports camera according to claim 1, wherein said motion parameter detection display module further comprises a display screen, said display screen being connected with the main control unit.

3. The sports camera according to claim 2, wherein said display screen is LCD screen.

4. The sports camera according to claim 2, wherein said display screen is TFT screen.

5. The sports camera according to claim 1, wherein said digital signal processor is provided with a storage card interface, a USB interface and a HDMI interface.

6. The sports camera according to claim 2, wherein said digital signal processor is provided with a storage card interface, a USB interface and a HDMI interface.

7. The sports camera according to claim 3, wherein said digital signal processor is provided with a storage card interface, a USB interface and a HDMI interface.

8. The sports camera according to claim 4, wherein said digital signal processor is provided with a storage card interface, a USB interface and a HDMI interface.

9. The sports camera according to claim 1, wherein the chip type of the main control unit is STM32F051C8 or STM32F100C8.

10. The sports camera according to claim 2, wherein the chip type of the main control unit is STM32F051C8 or STM32F100C8.

11. The sports camera according to claim 3, wherein the chip type of the main control unit is STM32F051C8 or STM32F100C8.

12. The sports camera according to claim 4, wherein the chip type of the main control unit is STM32F051C8 or STM32F100C8.

13. The sports camera according to claim 1, wherein further comprises a keypad, said main control unit being connected with the keypad.

14. The sports camera according to claim 2, wherein further comprises a keypad, said main control unit being connected with the keypad.

15. The sports camera according to claim 3, wherein further comprises a keypad, said main control unit being connected with the keypad.

16. The sports camera according to claim 4, wherein further comprises a keypad, said main control unit being connected with the keypad.

17. The sports camera according to claim 1, wherein further comprises an indicating light and a shift key, said digital signal processor being connected with the indicating light and the shift key.

18. The sports camera according to claim 2, wherein further comprises an indicating light and a shift key, said digital signal processor being connected with the indicating light and the shift key.

19. The sports camera according to claim 1, wherein the power supply module is rechargeable battery.

20. The sports camera according to claim 1, wherein
when the camera is switched on, the acceleration sensor detects a deflecting angle of the camera and then sends the detected deflecting angle information to the main control unit, the main control unit sends the deflecting angle information to the digital signal processor, and the digital signal processor makes a comparison between the obtained deflecting angle information and 0 degree;
when the deflecting angle is within 0-45 degree or 315-360 degree, inclusive of end values, the digital signal processor directly stores an image taken by the camera without making any regulation of revolving the image;
when the deflecting angle is within 45-135 degree, exclusive of end values, the digital signal processor makes the image do a 90 degree rotation and then save the rotated image;
when the deflecting angle is within 135-225 degree, inclusive of end values, the digital signal processor makes the image do a 180 degree rotation and then save the rotated image;
when the deflecting angle is within 225-315 degree, exclusive of end values, the digital signal processor makes the images do a 270 degree rotation and then save the rotated image.

* * * * *